（12） United States Patent
Veiga

(10) Patent No.: US 10,094,474 B2
(45) Date of Patent: *Oct. 9, 2018

(54) DOUBLE-SHOULDER, DOUBLE-RAIL SERRATED METAL GASKET

(71) Applicant: Teadit N.A., Inc., Pasadena, TX (US)

(72) Inventor: Jose Carlos Carvalho Veiga, Rio de Janeiro (BR)

(73) Assignee: Teadit N.A., Inc., Pasadena, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,177

(22) Filed: Dec. 28, 2017

(65) Prior Publication Data

US 2018/0135754 A1    May 17, 2018

Related U.S. Application Data

(63) Continuation-in-part of application No. 14/721,399, filed on May 26, 2015, now Pat. No. 9,890,859.

(51) Int. Cl.
*F16J 15/06* (2006.01)
*F16J 15/08* (2006.01)
(Continued)

(52) U.S. Cl.
CPC ......... *F16J 15/065* (2013.01); *F16J 15/0818* (2013.01); *F16J 15/122* (2013.01);
(Continued)

(58) Field of Classification Search
CPC ........ F16J 15/122; F16J 15/102; F16J 15/104; F16J 15/064; F16L 23/18; F16L 23/22; F16L 23/16
See application file for complete search history.

(56) References Cited

U.S. PATENT DOCUMENTS 2,127,372 A    8/1938  Victor
3,542,382 A    11/1970 Hangmann
(Continued)

FOREIGN PATENT DOCUMENTS

EP    2226544 A1    9/2010
EP    2607753 A1    6/2013

OTHER PUBLICATIONS

3-Flow Inc., Defender FS™ Sealing/Isolating Gaskets and Flange Isolation Kits, Feb. 2, 2015, retrieved from the Internet on Jul. 18, 2016. (4 pages) https://web.archive.org/web/20150202131450/http://3-flow.com/products/fireSafe.htm.
(Continued)

*Primary Examiner* — Vishal A Patel
(74) *Attorney, Agent, or Firm* — Haynes and Boone, LLP

(57) ABSTRACT

An isolation gasket that includes a metal core (100) defining an inner serrated annular section (105) that is radially spaced from an outer serrated annular section (110); and an annular groove (115) formed between the inner and outer serrated annular sections; and a first material (135) accommodated in the annular groove (115). In certain embodiments, a second material (125) is coupled to the inner serrated annular section (105); and a third material (130) is coupled to the outer serrated annular section (110). In one embodiment, the second material (125) has a first thickness (160) and the third material (130) has a second thickness (165) that is less than the first thickness (160). In one embodiment, the metal core (100) defines a first inner diameter (180) and the second material defines a second inner diameter (157) that is less than the first inner diameter (180).

20 Claims, 10 Drawing Sheets

(51) Int. Cl.
*F16J 15/12* (2006.01)
*F16L 25/02* (2006.01)
*F16L 57/04* (2006.01)
*F16L 58/18* (2006.01)
*F16L 23/18* (2006.01)

(52) U.S. Cl.
CPC ........ *F16J 2015/0856* (2013.01); *F16L 23/18* (2013.01); *F16L 25/026* (2013.01); *F16L 57/04* (2013.01); *F16L 58/187* (2013.01)

(56) References Cited

U.S. PATENT DOCUMENTS

| | | |
|---|---|---|
| 4,121,858 A | 10/1978 | Schulz |
| 4,406,467 A | 9/1983 | Burger et al. |
| 4,750,370 A | 6/1988 | Ossyra |
| 5,511,797 A | 4/1996 | Nikirk et al. |
| 6,457,726 B1 | 10/2002 | Jung |
| 8,382,122 B2 | 2/2013 | Ueda et al. |
| 2009/0044904 A1 | 2/2009 | Ragsdale et al. |
| 2009/0115139 A1 | 5/2009 | Jenkins |
| 2011/0115170 A1 | 5/2011 | Krejci |
| 2012/0235365 A1 | 9/2012 | Stubblefield |
| 2013/0328270 A1* | 12/2013 | Stubblefield ........... F16J 15/122 277/314 |
| 2015/0060352 A1 | 3/2015 | Yoder et al. |
| 2015/0330509 A1* | 11/2015 | Malus .................. F16J 15/0887 277/608 |

OTHER PUBLICATIONS

International Search Report and Written Opinion for International Application No. PCT/US2016/033205 dated Aug. 31, 2016. (12 pages).

* cited by examiner

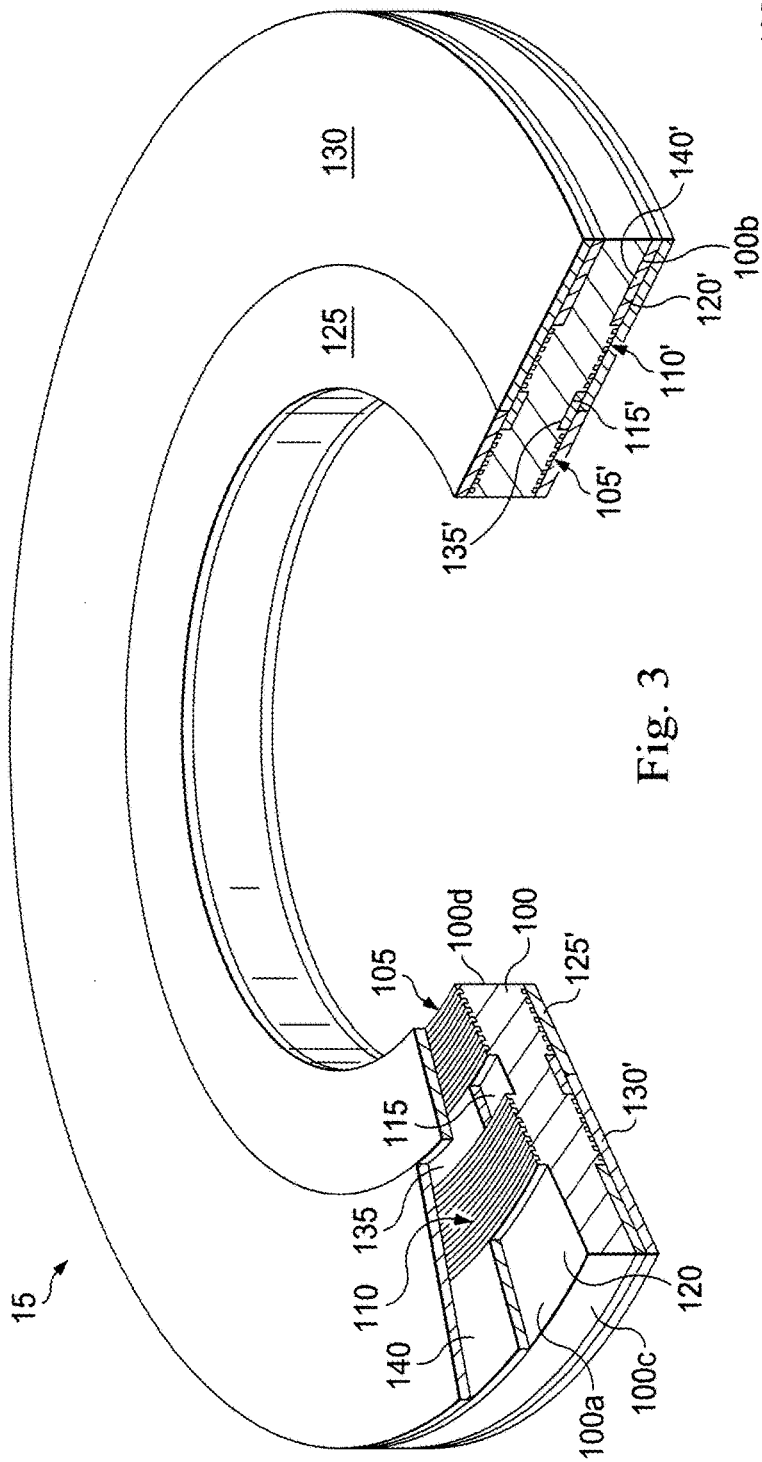
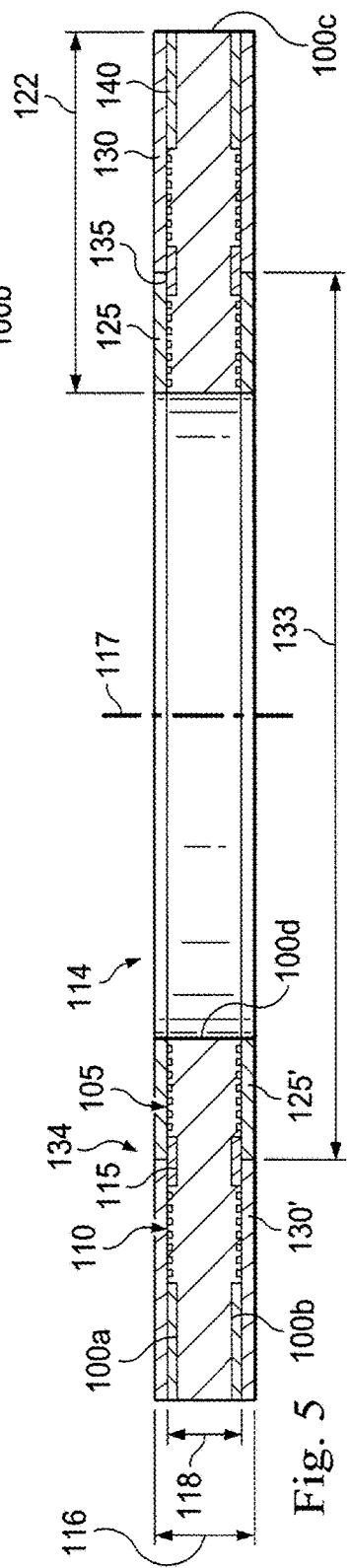
Fig. 3
Fig. 5

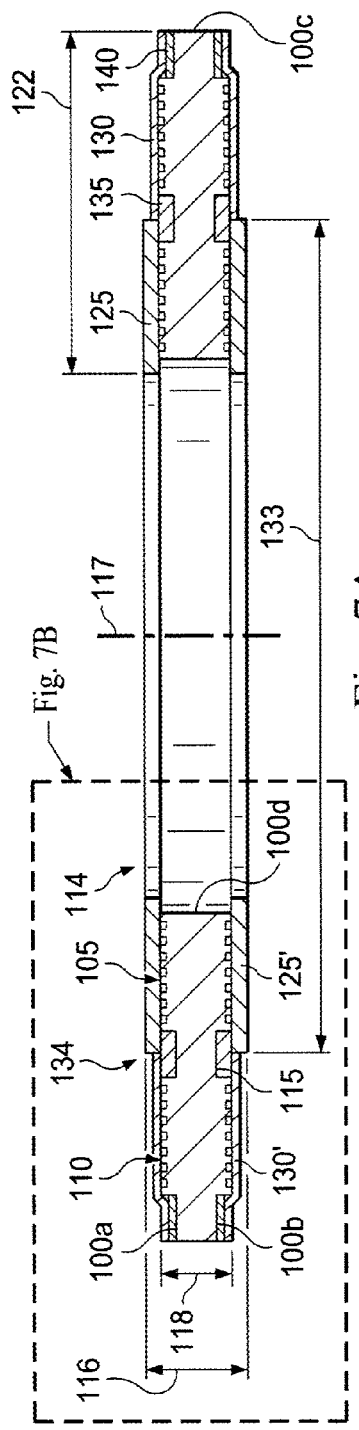
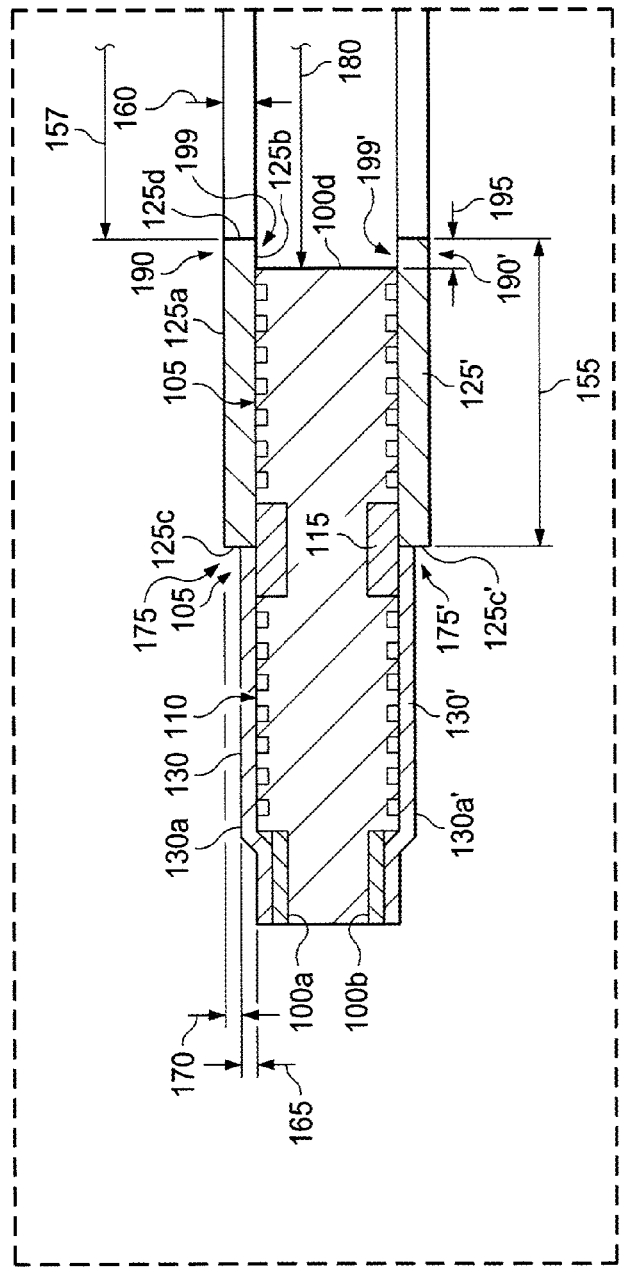

US 10,094,474 B2

DOUBLE-SHOULDER, DOUBLE-RAIL SERRATED METAL GASKET

RELATED APPLICATION

The present application is a continuation-in-part of U.S. patent application Ser. No. 14/721,399 filed May 26, 2015, the entire contents of which are specifically incorporated herein by reference.

FIELD OF THE INVENTION

The present application relates to a serrated metal gasket. More particularly, the present application relates to a double-shoulder, double-rail serrated metal gasket used for sealing flanged joints.

BACKGROUND

A metal pipeline or pipe installation that is buried underground or under a seabed reacts similarly as a metal immersed in an electrolyte. With changes in the underground environment, such as changes due to rain and humidity, electrical potentials can vary between points along the length of the pipeline to create anodic and cathodic regions. These regions may then form the basis for a corrosion cell in which a cathode (i.e., a point along the pipeline in the cathodic region), an anode (i.e., a point along the pipeline in the anodic region), and an electrical connection between the cathode and anode is formed. When this occurs, the metal within the pipeline that forms the anodic region will be corroded. However, corrosion may be prevented if the electrical connection between the cathode and anode is interrupted. Thus, an electrical insulation gasket, or isolation gasket, may be used between two flanged joints within the metal pipeline to interrupt the electrical current between the cathode and anode.

Both metallic and non-metallic electrical insulation gaskets are used within a variety of industries, including those that process liquids, gases, and gaseous hydrocarbons, to seal flanged joints.

Metallic gaskets can be divided into two principal categories: flat gaskets and ring-joint gaskets. Both gaskets are manufactured from a metal or alloy with or without a soft filler or facing. Non-metallic gasket can be manufactured from several materials, each one to meet the demand for each application. The most ordinary is the compressed fibers gasket sheets, manufactured by vulcanization under pressure of mineral or synthetic fibers with a combination of elastomers. Another non-metallic gasket option for high chemical resistance is a restructured polytetrafluoroethylene ("PTFE") gasket, which can be virgin or blended with other materials. Another conventional embodiment is a phenolic or epoxy resin laminate faced with an elastomer such as styrene-butadiene or styrene-butadiene rubber ("SBR"), nitrile rubber ("NBR"), or chloroprene rubber ("CR"). While non-metallic gaskets adequately provide electrical insulation and fire safe protection, they generally do not provide the mechanical strength necessary for high-pressure applications in pipeline or offshore oil extraction. For these high-pressure applications, a metallic gasket is required to avoid blowout or other failure.

Conventional metallic gaskets that provide fire safe and blowout protection for high-pressure applications are composed of a metal core with two facing materials. One of the facing materials provides the sealing capabilities and the other provides the fire safe protection, while the metal core provides protection against blowout. Metallic gaskets generally form a portion of a sealing assembly and are tested for specific sealing and electrical properties while forming a portion of the sealing assembly. Typical minimum sealability value is of Class BH per ISO standard 15848-1, which corresponds with a sealability of $\leq 10^{-4}$ mg·s$^{-1}$·m$^{-1}$ with He at 40 bar and bolts of the sealing assembly tightened to 50% of the yield stress of the bolt material. The required electrical insulation properties are resistivity of 10 mega-ohm (M$\Omega$) with 1000V DC and a dielectric strength of 3 kilo-volts (kV) for 1 minute. Generally, these conventional metallic gaskets have a low flashover voltage threshold and low electrical resistance due to an electrical "leak path" formed near an interface of the two facing materials that provide the sealing capabilities and the fire safe protection.

BRIEF DESCRIPTION OF THE DRAWINGS

FIG. 3 illustrates a partial perspective cutaway view of the isolation gasket of FIG. 1, according to an example embodiment of the present disclosure.

FIG. 5 illustrates a sectional view of the isolation gasket of FIG. 1, according to an example embodiment of the present disclosure.

FIG. 7A illustrates a sectional view of the isolation gasket of FIG. 6, according to an example embodiment of the present disclosure.

FIG. 7B is an enlarged view of a portion of FIG. 7A, according to an example embodiment of the present disclosure.

DETAILED DESCRIPTION

Figure 1:
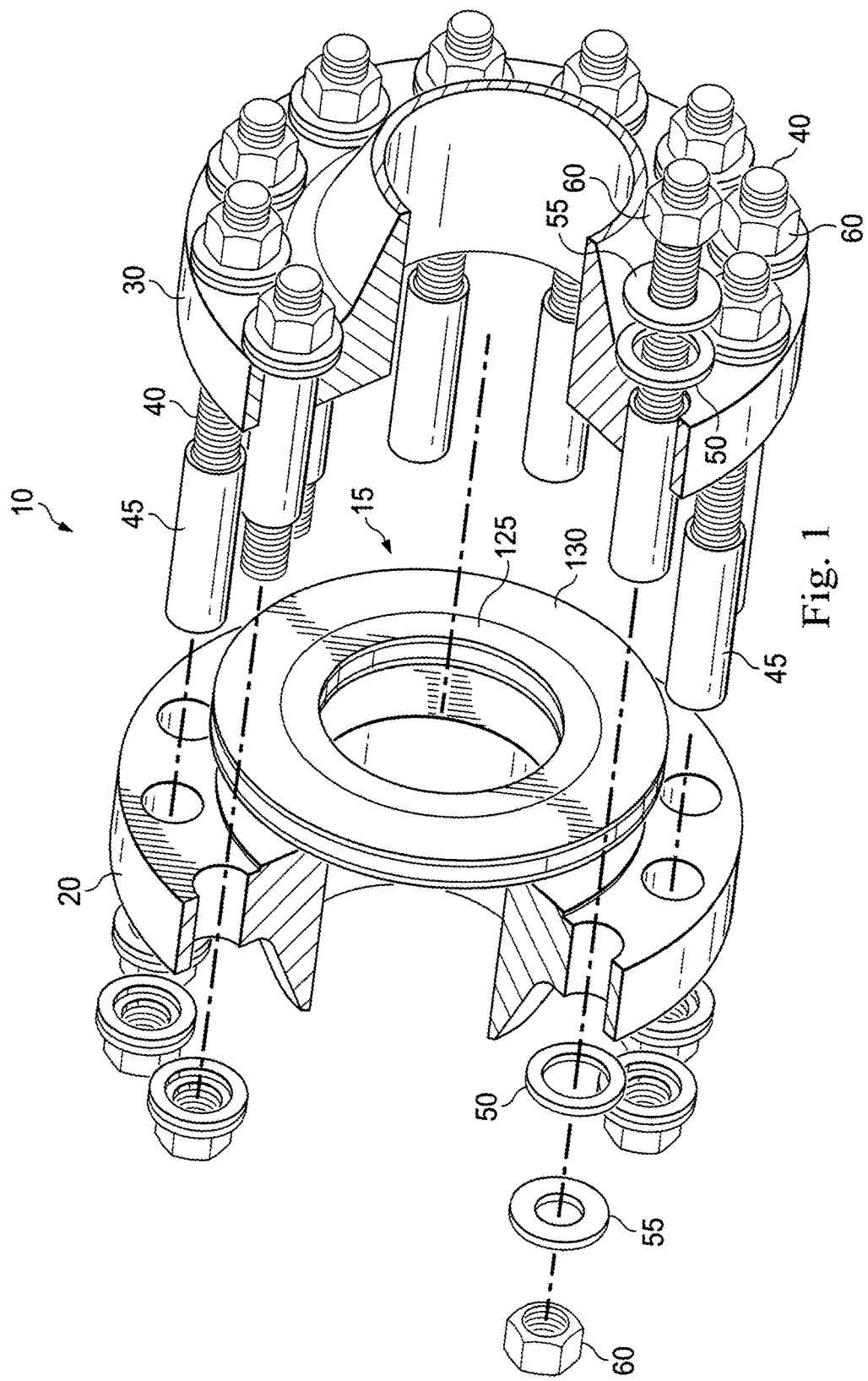
FIG. 1 illustrates an exploded view of a sealing assembly, according to an example embodiment of the present disclosure, the sealing assembly including an isolation gasket.

Reference is now made to the drawings that illustrate certain embodiments of the present disclosure. It should be understood that the present disclosure is not limited to the embodiments shown in the drawings.

The present disclosure provides an isolation gasket that includes a metal core defining: an inner serrated annular section that is radially spaced from an outer serrated annular section; and an annular groove formed between the inner and outer serrated annular sections; a first material accommodated in the annular groove; a second material coupled to the inner serrated annular section; and a third material coupled to the outer serrated annular section; wherein the second material has a first thickness; and wherein the third material has a second thickness that is less than the first thickness. According to one embodiment, the ratio of the first thickness to the second thickness is between about 4.0 and about 1.5. According to one embodiment, the ratio of the first thickness to the second thickness is about 2.0. According to one embodiment, the second material forms a first annular ring and has an outer surface defining an outer diameter; the third material forms a second annular ring having an inner surface that defines an inner diameter and an upper surface perpendicular to the inner surface; and a shoulder is formed between the outer surface on the first annular ring and the upper surface of the second annular ring. According to one embodiment, a bottom surface of the first material is coupled to an external surface of the metal core defining the groove; and an opposing top surface of the first material is coupled to both the second material and the third material. According to one embodiment, the second material comprises an electrical insulation material; and the third material comprises a fire safe material. According to one embodiment, the metal core has a surface that defines a first inner diameter; and the second material forms a first annular ring defining a second inner diameter that is less than the first inner diameter. According to one embodiment, a difference between the first inner diameter and the second inner diameter is between about 1.5 mm and about 6 mm.

The present disclosure also provides an isolation gasket that includes a metal core having a first inner diameter and defining: an inner serrated annular section that is radially spaced from an outer serrated annular section; and an annular groove formed between the inner and outer serrated annular sections; a first material accommodated in the annular groove; a second material coupled to the inner serrated annular section; and a third material coupled to the outer serrated annular section; wherein the second material forms a first annular ring defining a second inner diameter that is less than the first inner diameter. According to one embodiment, a difference between the first inner diameter and the second inner diameter is between about 1.5 mm and about 6 mm. According to one embodiment, a difference between the first inner diameter and the second inner diameter is about 3 mm. According to one embodiment, a shoulder is formed between a bottom surface of the second material that is coupled to the inner serrated annular section and a surface of the metal core that defines the first inner diameter. According to one embodiment, the second material has a first thickness; and the third material has a second thickness that is less than the first thickness. According to one embodiment, a bottom surface of the first material is coupled to an external surface of the metal core defining the groove; and an opposing top surface of the first material is coupled to both the second material and the third material.

The present disclosure also provides a method of electrically isolating flanged joints that includes accommodating a gasket between first and second flanged joints; wherein the gasket includes: a metal core having an inner diameter and including: a top surface forming a first annular serrated portion that is concentrically disposed within a second annular serrated portion, the first annular serrated portion being radially spaced from the second annular serrated portion by a top groove; and a bottom surface forming a third annular serrated portion that is concentrically disposed within a fourth annular serrated portion, the third annular serrated portion being radially spaced from the fourth annular serrated portion by a bottom groove; first and second sealing materials engaging at least a portion of the top surface, the second sealing material being concentrically disposed about an external surface of the first sealing material; and third and fourth sealing materials engaging at least a portion of the bottom surface, the fourth sealing material being concentrically disposed about an external surface of the third sealing material; wherein the first sealing material has a first thickness; wherein the second sealing material has a second thickness that is less than the first thickness; wherein the third sealing material has a third thickness; wherein the fourth sealing material has a fourth thickness that is less than the third thickness; wherein the first sealing material forms a first annular ring defining a first inner diameter that is less than the inner diameter of the metal core; and wherein the third sealing material forms a second annular ring defining a second inner diameter that is less than the inner diameter of the metal core; and compressing the gasket, using the first and second flanged joints, to sealingly engage the first and second sealing materials with the first flange joint and to sealingly engage the third and fourth sealing materials with the second flange joint. According to one embodiment, the ratio of the first thickness to the second thickness is between about 4.0 and about 1.5; and the ratio of the third thickness to the fourth thickness is between about 4.0 and about 1.5. According to one embodiment, the ratio of the first thickness to the second thickness is about 2.0; and the ratio of the third thickness to the fourth thickness is about 2.0. According to one embodiment, a first difference between the inner diameter of the metal core and the first inner diameter is about 3 mm; and a second difference between the inner diameter of the metal core and the second inner diameter is about 3 mm. According to one embodiment, a first difference between the inner diameter of the metal core and the first inner diameter is between about 1.5 mm and about 6 mm; and a second difference between the inner diameter of the metal core and the second inner diameter is between about 1.5 mm and about 6 mm. According to one embodiment, a first annular shoulder is formed between a bottom surface of the first sealing material and a surface of the metal core that defines the inner diameter; and a second annular shoulder is formed between a bottom surface of the third sealing material and the surface of the metal core that defines the inner diameter.

The present disclosure provides an isolation gasket that includes a metal core defining: an inner serrated annular section that is radially spaced from an outer serrated annular section; and an annular groove formed between the inner and outer serrated annular sections; and a first material accommodated in the annular groove. According to one embodiment, the gasket also includes a second material coupled to the inner serrated annular section; and a third material coupled to the outer serrated annular section. According to another embodiment, a bottom surface of the first material is coupled to an external surface of the metal core defining the groove; and an opposing top surface of the first material engages both the second material and the third material. In yet another embodiment, the second material comprises PTFE and the third material comprises a fire safe material. In certain embodiments, the first material comprises an electrical insulation material. In an example embodiment, the groove has a width between about (+/−5%) 2 mm and about 40 mm and a depth of about 0.5 mm to about 35 mm. In another example embodiment, the annular groove defines a mean groove diameter; wherein the second material is concentrically disposed about an external surface of the first material to form an interface between an outer diameter of the first material and an inner diameter of the second surface; and wherein the mean groove diameter coincides with the interface. In yet another example embodiment, the second material is adhered to the inner serrated annular surface and the third material is adhered to the outer serrated annular surface. In certain embodiments, the gasket has a thickness of about 3 mm to about 80 mm.

The present disclosure also provides a double-rail, serrated metal gasket for flange cathodic protection that includes a metal core having a top surface forming a first annular serrated portion that is concentrically disposed within a second annular serrated portion, the first annular serrated portion being radially spaced from the second annular serrated portion by an annular groove; a first sealing material that engages the first annular serrated portion of the metal core; and a second sealing material that engages the second annular serrated portion of the metal core; wherein the second sealing material is concentrically disposed about an external surface of the first sealing material. In an example embodiment, the gasket also includes a ring disposed within the annular groove. In another example embodiment, the ring comprises an electrical insulation material. In yet another example embodiment, the second sealing material comprises a fire safe material. In certain embodiments, the first sealing material comprises PTFE. In another example embodiment, the first and second sealing materials form an interface between an outer diameter of the first sealing material and an inner diameter of the second sealing material; and the ring is accommodated between the top surface and the interface. In yet another example embodiment, the gasket has a thickness of about 3 mm to about 80 mm.

The present disclosure also provides a method of electrically isolating flanged joints that includes accommodating a gasket between first and second flanged joints; wherein the gasket includes a metal core that includes a top surface forming a first annular serrated portion that is concentrically disposed within a second annular serrated portion, the first annular serrated portion being radially spaced from the second annular serrated portion by a top groove; and a bottom surface forming a third annular serrated portion that is concentrically disposed within a fourth annular serrated portion, the third annular serrated portion being radially spaced from the fourth annular serrated portion by a bottom groove; first and second sealing materials engaging at least a portion of the top surface, the second sealing material being concentrically disposed about an external surface of the first sealing material to form a first interface between an outer diameter of the first sealing material and an inner diameter of the second sealing material; third and fourth sealing materials engaging at least a portion of the bottom surface, the fourth sealing material being concentrically disposed about an external surface of the third sealing material to form a second interface between an outer diameter of the third sealing material and an inner diameter of the fourth sealing material; a first ring disposed within the top groove and between the top surface and the first interface; and a second ring disposed within the bottom groove and between the bottom surface and the second interface; and compressing the gasket using the first and second flanged joints to sealingly engage the first and second sealing materials to the first flange joint and to sealingly engage the third and fourth sealing materials to the second flange joint. In an example embodiment, each of the second and fourth sealing materials comprises a fire safe material; the second sealing material directly engages the second serrated annular portion; and the fourth sealing material directly engages the fourth serrated annular portion. In another example embodiment, each of the first and second rings comprises PTFE.

Figure 2:
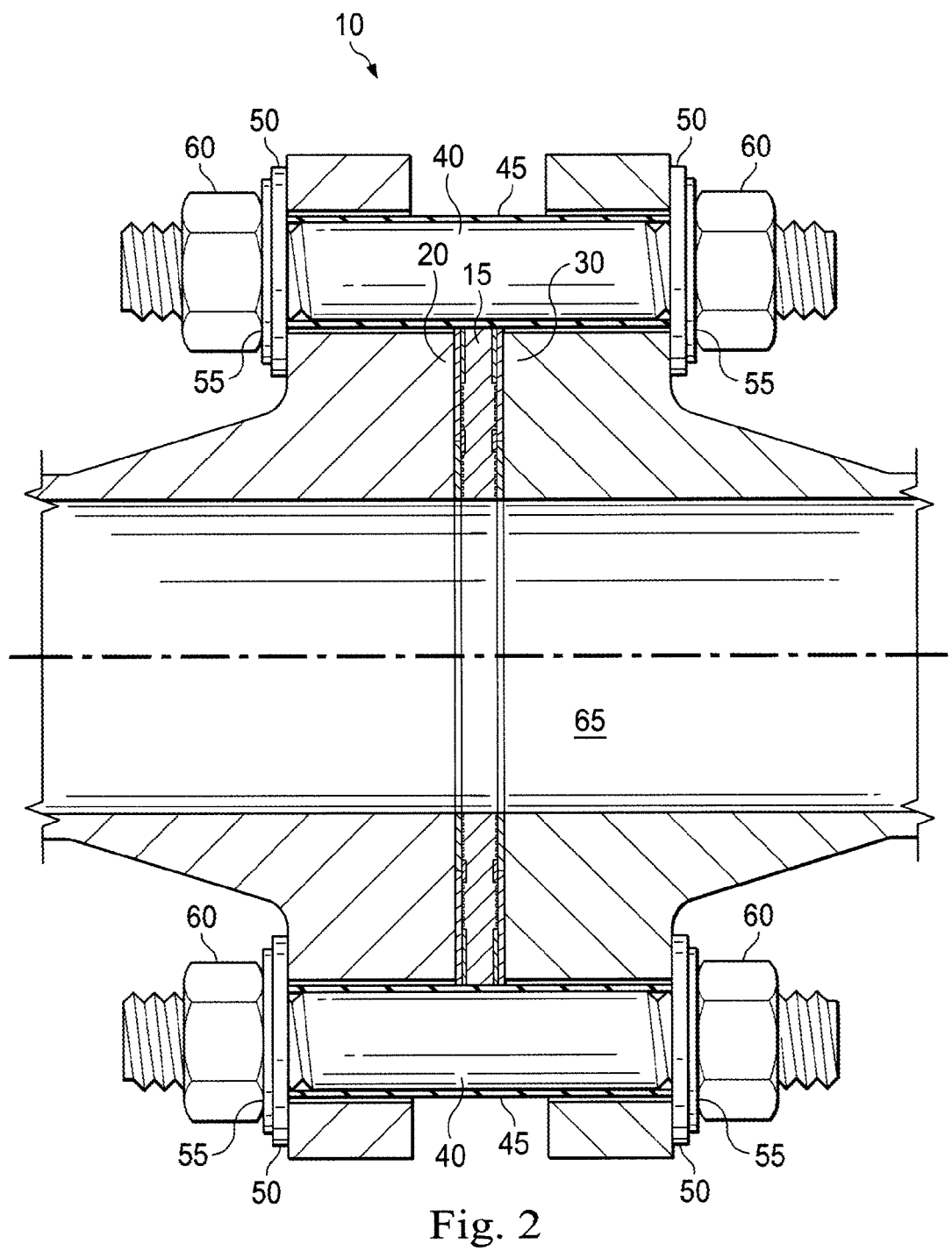
FIG. 2 illustrates a sectional view of the sealing assembly of FIG. 1, according to an example embodiment of the present disclosure.

FIG. 1 illustrates an exploded view and FIG. 2 illustrate a sectional view of a sealing assembly that is generally referred to by the reference numeral 10. The sealing assembly generally includes a gasket 15 placed between a flanged joint 20 that is coupled to or forms a portion of a pipe and a flanged joint 30 that is coupled to or forms a portion of another pipe. A plurality of bolts 40 are spaced around a diameter of the flanged joints 20 and 30 to hold the flanged joints 20 and 30 together. The bolts 40 also help to center the gasket 15 between the flanged joints 20 and 30. Insulation sleeves 45 that are formed from an insulation material such as epoxy or phenolic resin, are installed on each of the bolts 40 to prevent the bolts 40 from making electrical contact with the flanged joints 20 and 30. Insulation washers 50 are installed on the bolts 40 and against the flanged joints 20 and 30, followed by metallic washers 55 and nuts 60 to secure the bolts 40. The insulation washers 50 prevent electrical contact of the nuts 60 and the metallic washers 55 with the flanged joints 20 and 30. Generally, the flanged joints 20 and 30 define a fluid flow passage 65. While the flanged joints 20 and 30 shown in Figures 1and 2 are raised face flanges, the gasket 15 may also be placed between flanges that are flat face flanges or ring-joint faced flanges.

Figure 4:
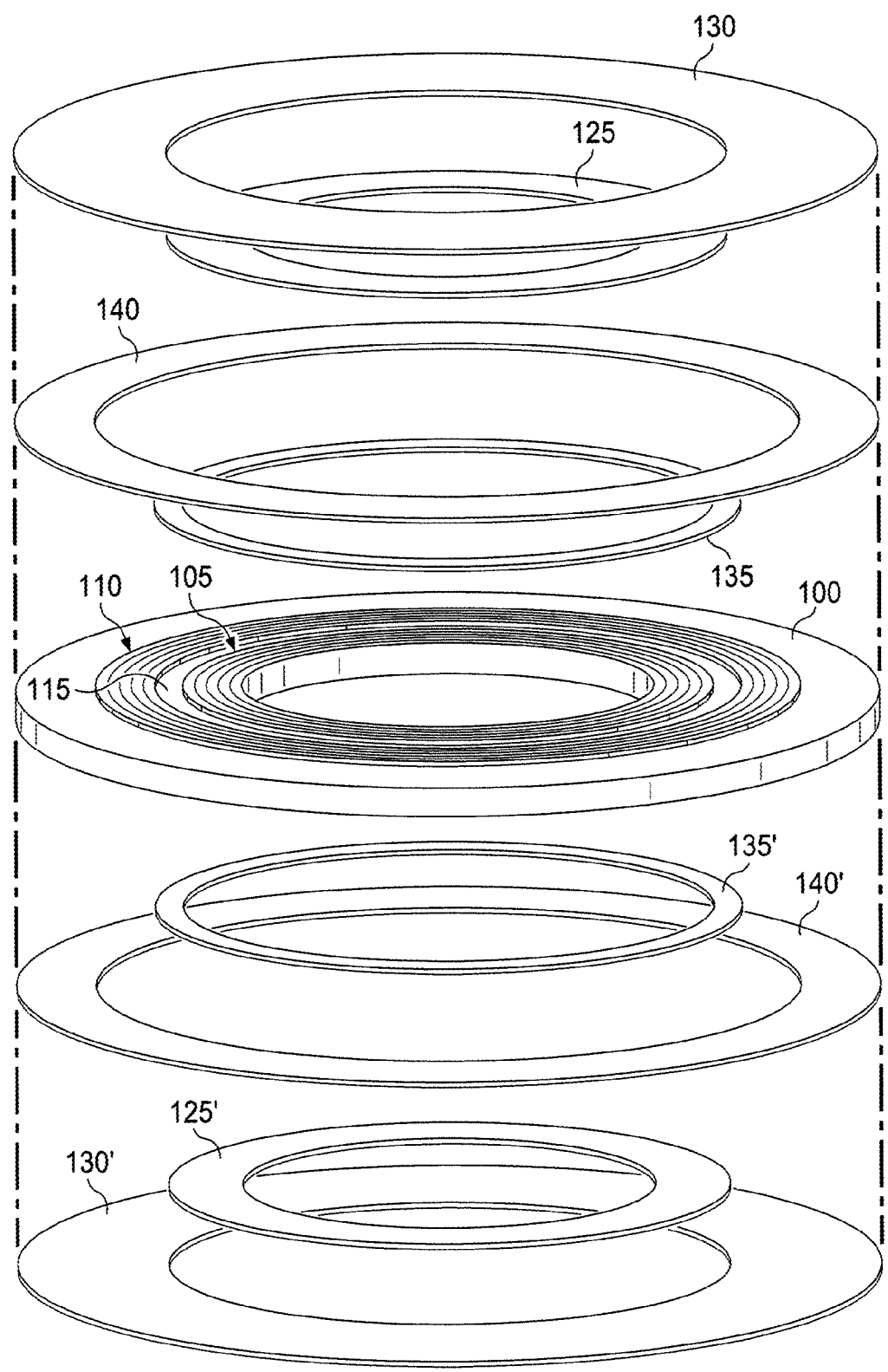
FIG. 4 illustrates an exploded view of the isolation gasket of FIG. 1, according to an example embodiment of the present disclosure.

FIG. 3 illustrates a partial perspective cutaway view of the gasket 15 while FIG. 4 illustrates an exploded perspective view of the gasket 15. FIG. 5 illustrates a sectional view of the gasket 15. As shown in FIGS. 3, 4, and/or 5, the gasket 15 has a metal core 100 forming a generally cylindrical body with a top surface 100a and an opposing bottom surface 100b. The gasket 15 also has an outer surface 100c that defines an outer diameter and an opposing inner surface 100d that defines an inner diameter. Generally, the inner diameter of the metal core 100 defines a bore 114, which forms a portion of the fluid flow passage 65. The top surface 100a forms a first annular serrated portion 105 and a second annular serrated portion 110. Thus, the gasket 15 is often referred to as a "double-rail serrated metal gasket." An annular groove 115 is formed in the top surface 100a of the metal core 105 between the first and second annular serrated portions 105 and 110. The groove 115 has a generally rectangular lateral cross-section, as shown in FIG. 5. When the gasket 15 has a thickness 116 of 6 mm (defined along a longitudinal axis 117 of the gasket 15 shown in FIG. 5), the groove 115 has a thickness, or depth, of about 1 mm. However, the thickness 116 of the gasket 15 may be between about 3 mm to about 80 mm and, the thickness, or depth, of the groove 115 may be a function of the thickness 116 of the gasket 15 and/or a thickness 118 of the metal core 100. For example, the ratio of the thickness 116 of the gasket 15 to the thickness of the groove 115 may be between about 10 to about 2. In an example embodiment, the thickness, or depth, of the groove 115 may be between about 0.5 mm to about 35 mm and the width of the grove 115 (measured in the radial direction) may be between about 2 mm to about 40 mm. The top surface 100a also forms an outer portion 120 that is defined between the outer surface 100c and the second annular portion 110. The top surface 100a also has a "width" 122 (measured in the radial direction). Generally, the first annular serrated portion 105 is defined between the inner surface 100d and the groove 115. Thus, the portions of the metal core 100—ordered from the inner diameter to the outer diameter—are: the first annular serrated portion 105, the groove 115, the second annular serrated portion 110, and the outer portion 120. The metal core 100 may be a flat, annular plate or disc and may be made of at least one suitable material known by those of ordinary skill in the art, such as carbon-rich or stainless steel, titanium, nickel, or nickel alloy. Generally, the metal core 100 is made of a material that is chemically and thermally compatible with the fluid flowing through the fluid flow passage 65.

The gasket 15 also includes inner facing material 125 and outer facing material 130, with each coupled to at least a portion of the top surface 100a of the metal core 100. In an example embodiment, the inner facing material 125 directly engages the first serrated portion 105 and the outer facing material 130 directly engages the second serrated portion 110. That is, no material or coatings are interposed between the inner and outer facing materials 125 and 130 and the first and second serrated portions 105 and 110, respectively. In an example embodiment, the groove 115 has a mean diameter 133.

The inner facing material 125 is an annular ring or disc having an inner diameter that corresponds with the inner diameter of the metal core 100 (or about 0.5 mm to about 3 mm less than the inner diameter of the metal core 100) and an outer diameter that is extends above or over the groove 115. In an example embodiment, the "width" of the inner facing material 125 (measured in a radial direction that is perpendicular to the longitudinal axis 117) is greater than the width of the first serrated portion 105. The inner facing material 125 provides sealing capabilities between the flanged joints 20 and 30 and also acts an insulation for cathodic protection. In an example embodiment, the inner facing material 125 is or comprises restructured PTFE ("rPTFE"). However, the inner facing material 125 may include any type of relatively soft gasketing material that has insulation properties, such as compressed fibers or an elastomer.

The outer facing material 130 is an annular ring or disk having an inner diameter that corresponds with the outer diameter of the inner facing material 125. That is, the outer facing material 130 is concentrically disposed about an outer surface of the inner facing material 125. Thus, the inner diameter of the outer facing material 130 and the outer diameter of the inner facing material 125 engage to form an interface 134 that extends above or over the groove 115. In an example embodiment, the interface 134 coincides with the mean diameter 133 of the groove 115. The outer facing material 130 also defines an outer diameter that corresponds with the outer diameter of the metal core 100. Thus, the outer facing material 130 extends over the second annular serrated portion 110 and the outer portion 120. In an example embodiment, the "width" of the outer facing material 130 (measured in the radial direction) is greater than the width of the second serrated portion 110 and the outer portion 120. Additionally, the combined width of the inner facing material 125 and the outer facing material 130 is equal to or substantially equal to (i.e., 5% tolerance) the width 122 of the top surface 100a of the metal core 100. The outer facing material 130 provides electrical insulation and provides fire safe protection in the event of a fire. In an example embodiment, the outer facing material 130 is or comprises an electrical insulation and fire safe laminate composed of mineral fibers and fillers. However, the outer facing material 130 may include any type of electrical insulation material that provides fire safe capabilities, or a fire safe material ("FS material"), such as, for example, mica, mineral fiber, and ceramic paper. Generally, the FS material maintains the seal formed by the gasket 15 in the event of a fire.

The gasket 15 also includes an inner ring 135 that is accommodated in the groove 115. That is, the inner ring 135 is sandwiched between the top surface 100a that forms the groove 115 and a portion of both the facing materials 125 and 130. The inner ring 135 contacts a bottom surface of the inner facing material 125 and a bottom surface of the outer facing material 130. The inner ring 135 provides sealing capabilities and also acts an electrical insulation at the interface 134, which is often associated with the "leak path" that can cause a low flashover voltage threshold and low electrical resistance. Thus, the disposal of the inner ring 135 between the interface 134 and the top surface 100a increases the voltage flashover threshold and electrical resistance of the gasket 15. In an example embodiment, the inner ring 135 is or comprises rPTFE. However, the inner ring 135 may include any type of relatively soft electrical insulator material, such as PTFE, compressed fibers, mica paper, and a variety of elastomers.

The gasket 15 also includes an outer ring 140 that is sandwiched between the top surface 100a forming the outer portion 120 and the outer facing material 130. The outer ring 140 acts as additional electrical insulation. The outer ring 140 and/or the outer portion 120 encourages proper placement of the gasket 15 relative to the fluid flow passage 65. That is, the outer ring 140 and/or the outer portion 120 encourage the centering of the gasket 15 within the sealing assembly 10. In an example embodiment, the outer ring 140 is or comprises the fire safe material. However, the outer ring 140 may include any type of relatively soft filler material.

In some embodiments, each of the inner and outer facing materials 125 and 130 and the inner and outer rings 135 and 140 is a relatively soft facing that may be made of any number of relatively soft filler materials that are known by those of ordinary skill in the art and that are capable of deforming when the gasket 15 is compressed between the flanged joints 20 and 30. For example, the relatively soft filler material may be a fluorocarbon resin, such as PTFE (e.g., molded and sintered PTFE, skived PTFE, molded or skived filled PTFE, restructured filled PTFE, laminated PTFE, and/or expanded PTFE), compressed fibers, mica, or ceramic fiber paper. In an example embodiment, the PTFE may comprise fillers such as, for example, barite, mineral silica, hollow glass microspheres, and synthetic silica. In one example embodiment, the PTFE is Teflon®.

The metal core 100 is formed or machined such that the bottom surface 100b of the metal core 100 is identical or nearly identical to the top surface 100a. Thus, the bottom surface 100b forms a first annular serrated portion 105', a groove 115', an outer annular serrated portion 110', and an outer portion 120' that are identical to the first annular serrated portion 105, the groove 115, the outer annular serrated portion 110, and the outer portion 120. Additionally, an inner facing material 125', an outer facing material 130', an inner ring 135' and an outer ring 140' that are identical to the inner facing material 125, the outer facing material 130, the inner ring 135, and the outer ring 140 are provided in similar positions on the bottom surface 100b. The bottom surface 100b and related components form a mirror-image of the top surface 100a and related components. Thus, no further detail will be provided here regarding the bottom surface 100b and its related components.

Figure 6:
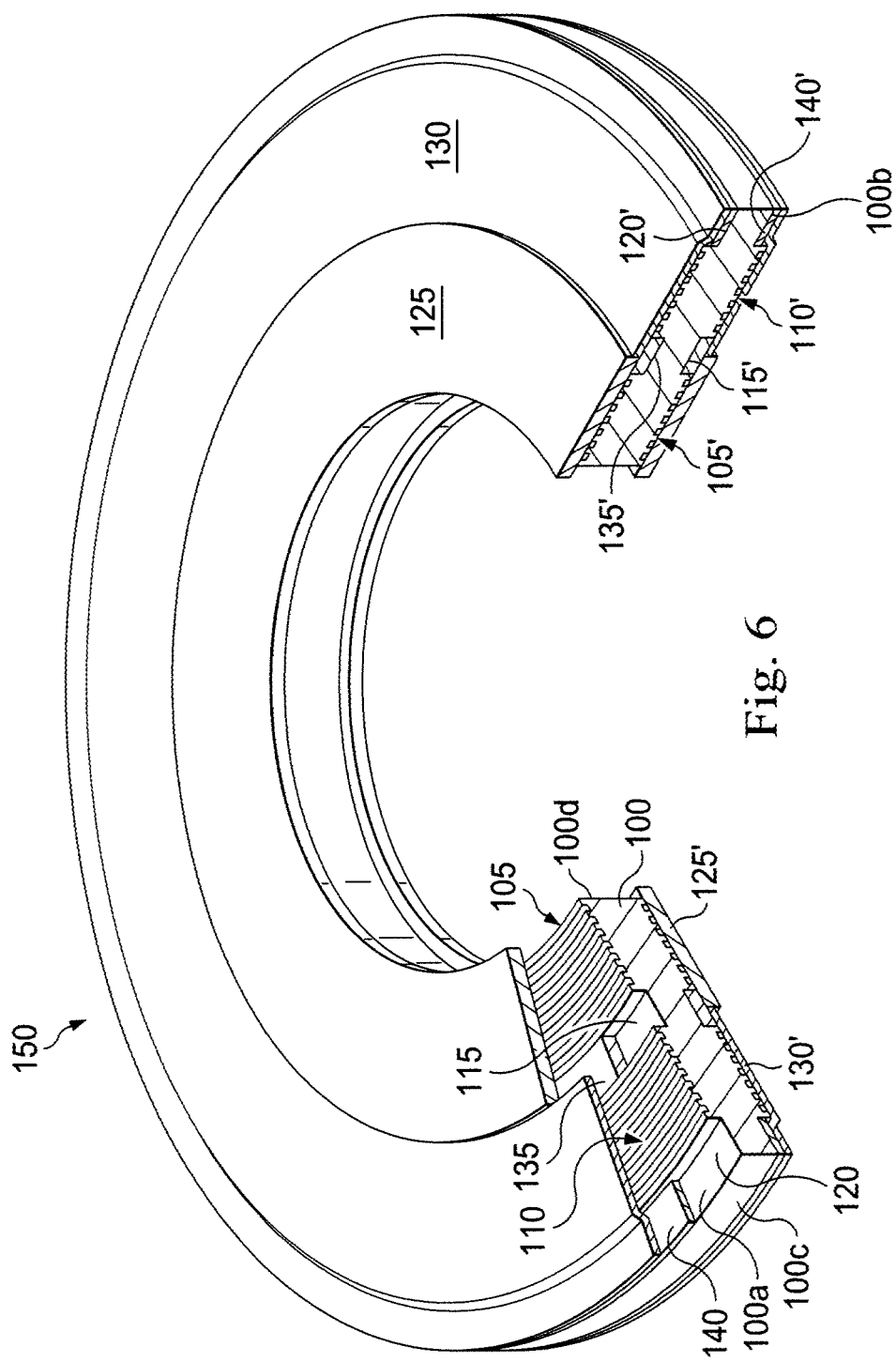
FIG. 6 illustrates a partial perspective cutaway view of the isolation gasket of FIG. 1, according to another example embodiment of the present disclosure.

FIG. 6 illustrates a partial perspective cutaway view of another embodiment of the gasket 15 referred to by the numeral 150. FIGS. 7A and 7B illustrate a sectional view of the gasket 150. The gasket 150 is similar to the gasket 15, except for the size of the inner facing materials 125 and 125'. The reference numerals for the features of the gasket 15 are identical to the reference numerals for the features of the gasket 150.

In some embodiments, the inner facing materials 125 and 125' of the gasket 150 are thicker than the inner facing materials 125 and 125' of the gasket 15. The inner facing material 125 defines a top surface 125a; an opposing bottom surface 125b that contacts the first annular serrated portion 105; a first side surface 125c that contacts the inner ring 135 and the outer facing material 130; and an opposing second side surface 125d that defines an inner diameter 157 of the inner facing material 125. In some embodiments, the inner facing material 125 has a width 155 that is defined between the first and second side surfaces 125c and 125d in the radial direction. In some embodiments, the inner facing material 125 has a thickness 160 that is defined between the top surface 125a and the bottom surface 125b along the longitudinal axis 117 of the gasket 150. In some embodiments, the thickness 160 of the inner facing material 125 is greater than a thickness 165 (defined along the longitudinal axis 117 of the gasket 150) of the outer facing material 130. Thus, a difference 170 is defined between the thickness 160 of the inner facing material 125 and the thickness 165 of the outer facing material 130. A shoulder 175 is also formed between a top surface 130a of the outer facing material 130 and the first side surface 125c of the inner facing material 125. A shoulder 175' is also formed between a top surface 130a' of the outer facing material 130' and the first side surface 125c' of the inner facing material 125'. Thus, the gasket 150 is often referred to as a "double-shoulder, double-rail serrated metal gasket." In some embodiments, each of the shoulders 175 and 175' is an annular shoulder. In some embodiments, the thickness 160 is, or is about, 0.8 mm and the thickness 165 is, or is about, 0.4 mm. Thus, in some embodiments the ratio of the thickness 160 to the thickness 165 is about 2. However, in other embodiments, the ratio of the thickness 160 to the thickness 165 may be between about 4 and 1.5. In other embodiments, the thickness 160 is between about 0.5 mm and 2.0 mm and the thickness 165 is between about 0.2 mm and 1.0 mm. In some embodiments, the compressibility of the inner facing material 125 is greater than the compressibility of the outer facing material 130. In other embodiments, the firmness of the outer facing material 130 is greater than the inner facing material 125. For example, when the outer facing material 130, having an initial thickness, is compressed from 0 MPa to 100 MPa, the outer facing material 130 is compressed to approximately 66% of its initial thickness. When the inner facing material 125, having an initial thickness, is compressed from 0 MPa to 100 MPa, the inner facing material 125 is compressed to approximately 50% of its initial thickness. Thus, the inner facing material 125 is generally less firm than the outer facing material 130.

Additionally, and in some embodiments, the inner diameter 157 of the inner facing material 125 is less than an inner diameter 180 of the metal core 100. In some embodiments, the inner facing material 125 creates an overhang 190 that is defined by a difference 195. Generally, the difference 195 is half of the difference between the inner diameters 180 and 157. The overhang 190 creates a shoulder 199 between the bottom surface 125b and the surface 100d. The overhang 190' creates a shoulder 199' between the bottom surface 125b' and the surface 100d'. In some embodiments, each of the shoulders 199 and 199' is an annular shoulder. Thus, the gasket 150 is often referred to as a "double-shoulder, double-rail serrated metal gasket." In some embodiments, the difference 195 is about 1.5 mm, with the difference in the inner diameters 180 and 157 being about 3 mm. In other embodiments, the difference 195 is any value between about 0.75 mm and about 3 mm, with the difference in the inner diameters 180 and 157 being between about 1.5 mm and about 6 mm. However, other dimensions for the difference 195 are contemplated here.

Figure 8:
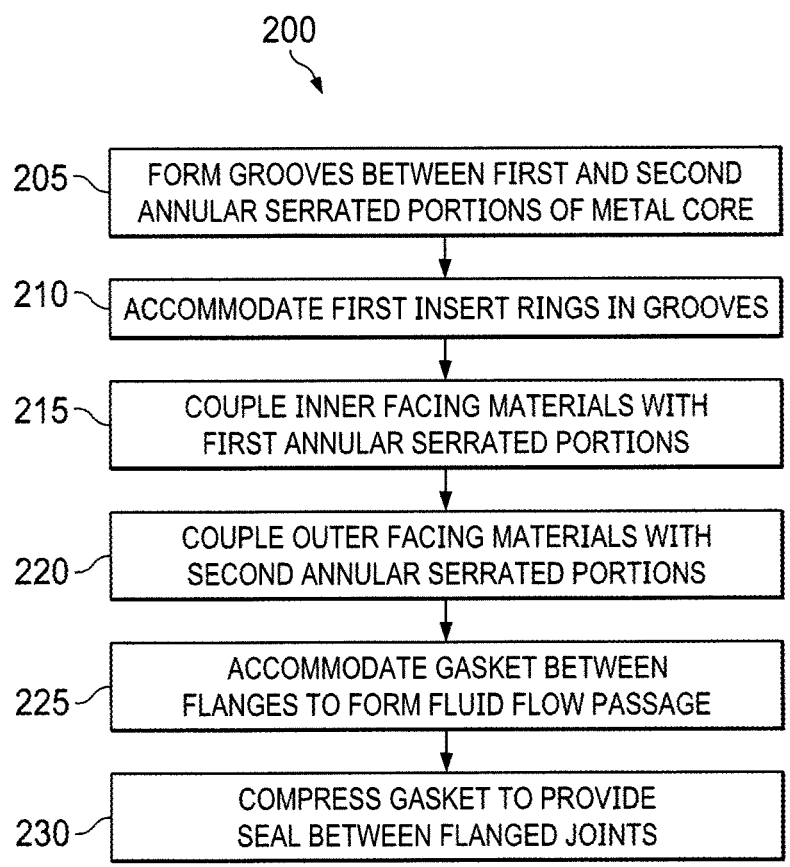
FIG. 8 is a flow chart illustration of a method of operating the assembly of FIG. 1, according to an example embodiment.

As illustrated in FIG. 8, with reference to FIGS. 1-6, 7A, and 7B, a method 200 of altering a flashover location and reducing the voltage breakdown of the sealing assembly 10 includes forming the grooves 115 and 115' at step 205; accommodating the inner rings 135 and 135' in the grooves 115 and 115' at step 210; coupling the inner facing materials 125 and 125' to the first annular serrated portions 105 and 105' at step 215; coupling the outer facing materials 130 and 130' to the second annular serrated portions 110 and 110' at step 220; accommodating the gasket 15 between flanged joints 20 and 30 to form the fluid flow passage 65 at step 225; and compressing the gasket 15 to provide a seal between the faces of the flanged joints 20 and 30 at step 230.

At the step 205, the grooves 115 and 115' are formed in the metal core 100. The grooves 115 and 115' are formed to have the mean diameter 133 and a depth of about 1 mm. However the depth of the groove 115 may be between about 0.5 mm to about 35 mm and the width of the grove 115 (measured in the radial direction) may be between about 2 mm to about 40 mm.

At the step 210, the first insert rings 135 and 135' are accommodated in the grooves 115 and 115', respectively. In an example embodiment, the first insert rings 135 and 135' are adhered to the metal core 100. However, in other embodiments, the first insert rings 135 and 135' are in direct contact (no adhesive required) with the metal core 100. The first insert rings 135 and 135' may be bonded to the grooves 115 and 115', respectively.

At the step 215, the inner facing materials 125 and 125' are coupled to the first annular serrated portions 105 and 105', respectively. The inner facing materials 125 and 125' are arranged on the metal core 100 such that the outer diameter of the inner facing materials 125 and 125' coincides with the mean diameter 133 of the grooves 115 and 115'. In an example embodiment, the inner facing materials 125 and 125' are adhered to the serrated portions 105 and 105', respectively. However, in other embodiments, the inner facing materials 125 and 125' are in direct contact (no adhesive required) with the serrated portions 105 and 105', respectively. The inner facing materials 125 and 125' may be bonded to the serrated portions 105 and 105', respectively.

At the step 220, the outer facing materials 130 and 130' are coupled to the second annular serrated portions 110 and 110' respectively. The outer facing materials 130 and 130' are arranged on the metal core 100 such that the inner diameter of the outer facing materials 130 and 130' coincides with the mean diameter 133 of the grooves 115 and 115' and the outer diameter of the inner facing materials 125 and 125'. In an example embodiment, the outer facing materials 130 and 130' are adhered to the serrated portions 110 and 110', respectively. However, in other embodiments, the outer facing materials 130 and 130' are in direct contact (no adhesive required) with the serrated portions 110 and 110', respectively. The outer facing materials 130 and 130' may be bonded to the serrated portions 110 and 110', respectively.

At the step 225, the gasket 15 is accommodated between the flanged joints 20 and 30 to form a portion of the fluid flow passage 65. Each of the inner and outer facing materials 125 and 130 engages a face of the flanged joint 20 and each of the inner and outer facing materials 125' and 130' engages a face of the flanged joint 30. In an example embodiment, the inner facing materials 125 and 125' are distinct and different than the outer facing materials 130 and 130'.

At the step 230, the gasket 15 is compressed to provide a seal between the flanged joints 20 and 30. The pressure or seating stress applied through the flanged joints 20 and 30 (via the bolts 40 and nuts 60) axially compresses the gasket 15 to create a seal between the faces of the flanged joints 20 and 30 and the gasket 15. The faces of the flanged joint 20 and 30 may contain small imperfections on the surface that may contribute to leakage of the fluid that flows through the fluid flow passage 65. The use of soft facing or soft filler materials (i.e., the inner facing materials 125 and 125' and the outer facing materials 130 and 130') allows for the soft filler materials to deform and fill any small imperfections to prevent leakage of the fluid. Additionally, compressing the gasket 15 in the axial direction may cause the inner facing materials 125 and 125' and the outer facing materials 130 and 130' to deform or compress into ridges formed within the inner serrated portions 105 and 105' and the outer serrated portions 110 and 110'.

Figure 9:
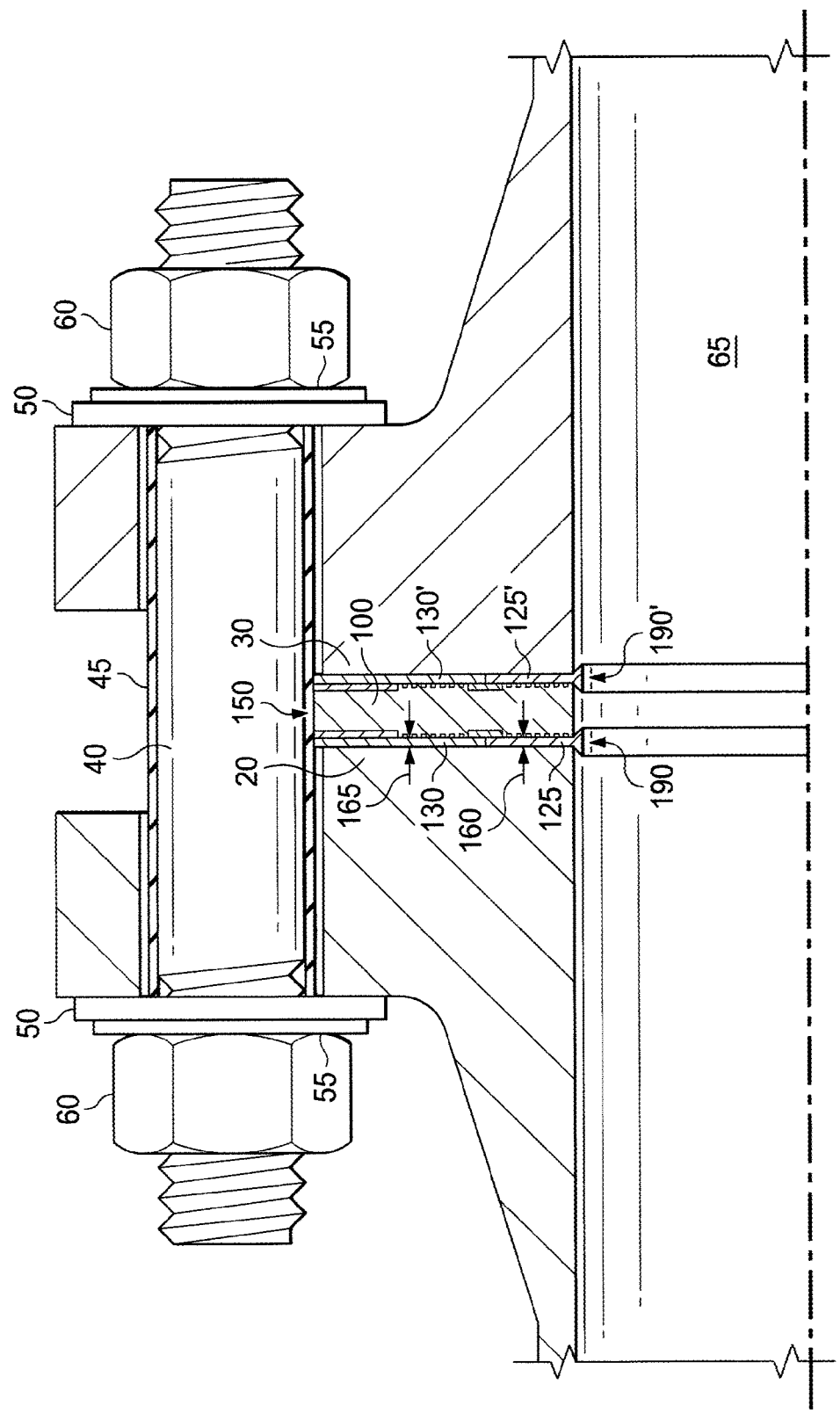
FIG. 9 illustrates a sectional view of a sealing assembly, according to another example embodiment of the present disclosure, the sealing assembly including the isolation gasket of FIG. 6.

The gasket 15 may be replaced with the gasket 150 in the method 200. At the step 230, the inner facing materials 125 and 125' of the gasket 150 are deformed in the axial direction, or compressed along the longitudinal axis 117 of the gasket 150, more than the outer facing materials 130 and 130' are deformed in the axial direction. That is, the change in the thickness 160 is greater than the change in the thickness 165 due to the compression between the flanged joints 20 and 30. FIG. 9 is an illustration of the gasket 150 compressed between the flanged joints 20 and 30 after the step 230. The overhangs 190 and 190' extend beyond the metal core 105 and into the fluid flow passage 65.

Using the method 200 and/or the gasket 150, the electrical resistance and/or dielectric strength of the gasket 150 is increased in comparison to conventional PTFE gaskets. With conventional PTFE gaskets, the PTFE facing has an inner diameter that is generally flush with the metal core. When subjected to a DC tension between flanges, the conventional PTFE gasket is capable of resisting 1 to 2 kV before the electrical resistance breaks and sparks form between the flange(s) and the metal core. When tested using identical methods, the gasket 150 is capable of resisting 5 kV. This is an increase between 5 and 2.5 times greater dielectric strength and/or electrical resistance. Thus, the gasket 150—at least in part due to the overhangs 190 and 190'—provides increased electrical resistance and/or dielectric strength compared to a conventional PTFE gasket.

Figure 10:
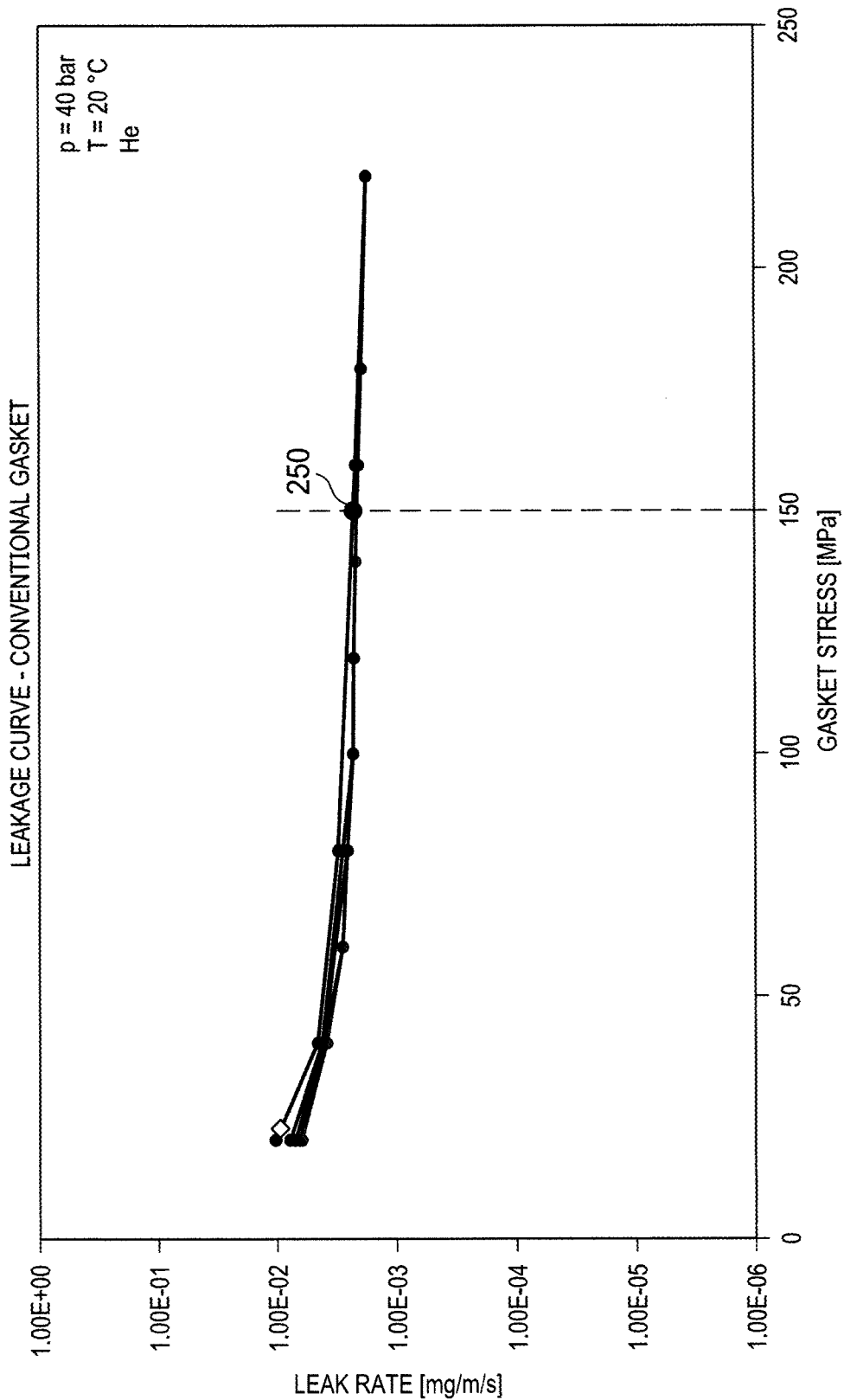
FIG. 10 is a chart depicting sealability test results of a conventional gasket.
Figure 11:
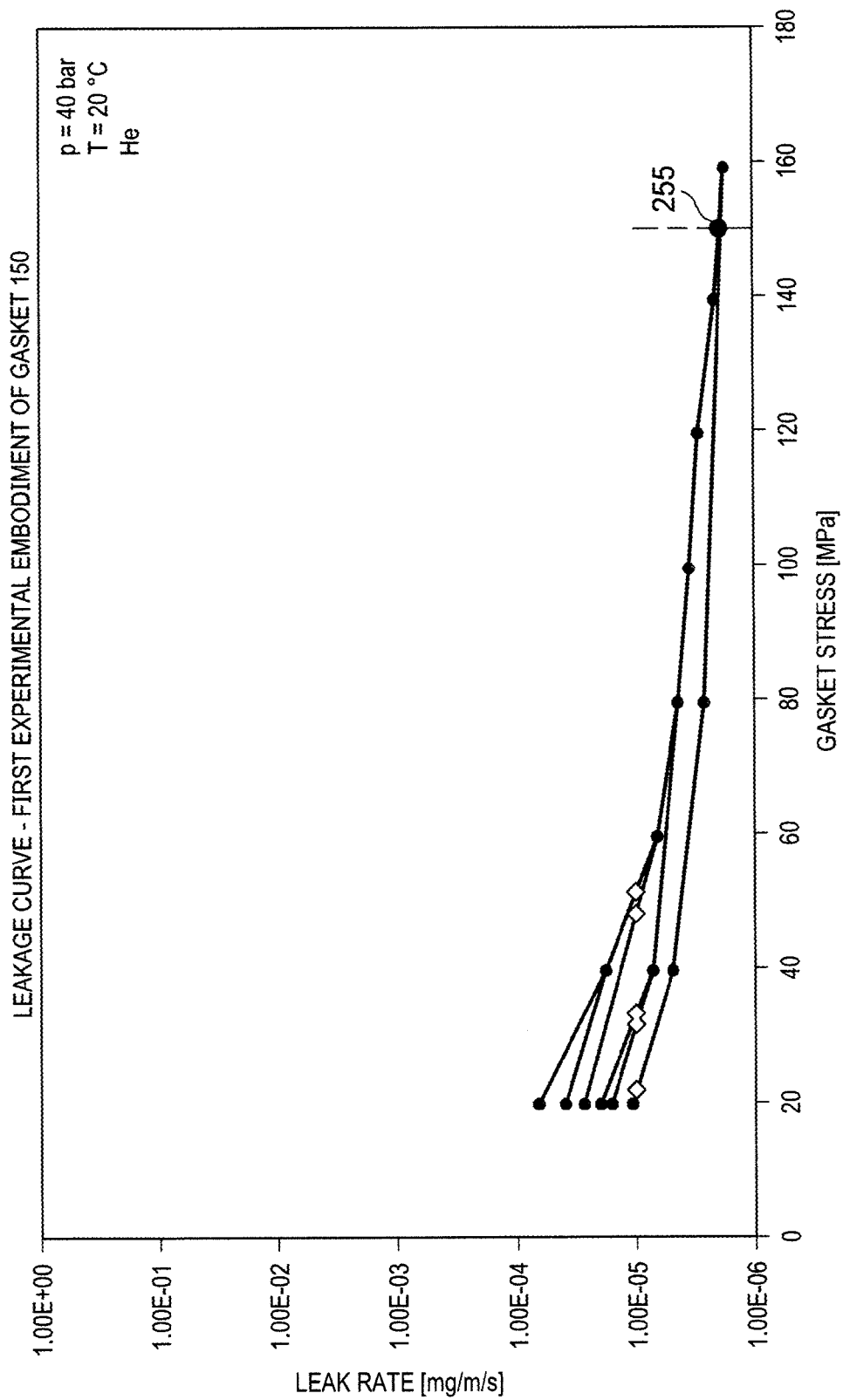
FIG. 11 is a chart depicting sealability test results of a First Experimental Embodiment of the gasket of FIG. 6.

FIG. 10 is a chart depicting the sealability test results of a conventional PTFE gasket that includes a first annular ring composed of a sealing material having a thickness that is the same as or substantially similar to a thickness of an outer, second ring composed of a fire protection facing material. As illustrated by the indicator referenced by the numeral 250 in FIG. 10, the conventional PTFE gasket exhibits a leak rate of $2.4 \times 10^{-3}$ mg·s$^{-1}$·m$^{-1}$ with He at 40 bar 150 MPa (14500 psi) seating stress. FIG. 11 is a chart depicting sealability test results of a First Experimental Embodiment of the gasket 150. As illustrated by the indicator referenced by the numeral 255 in FIG. 11, the First Experimental Embodiment of the gasket 150 exhibits a leak rate of $3.5 \times 10^{-6}$ mg·s$^{-1}$·m$^{-1}$ with He at 40 bar 150 MPa seating stress. Therefore, the First Experimental Embodiment of the gasket 150 has improved sealability compared to the conventional PTFE gasket (e.g., a leak rate of $3.5 \times 10^{-6}$ mg·s$^{-1}$·m$^{-1}$ compared to a leak rate of $2.4 \times 10^{3}$ mg·s$^{-1}$·m$^{-1}$). Specifically, and as illustrated in FIGS. 10 and 11, the First Experimental Embodiment of the gasket 150 has a leak rate that is 1,000 times less than the leak rate of the conventional PTFE gasket. Generally, the compressibility (i.e., reduction in thickness) of fire protection facing material is greater than the compressibility of the seal protection material. Thus, when the conventional PTFE gasket is compressed, the fire protection facing material reaches a minimum thickness before the seal protection material is compressed sufficiently to create a tight seal between a flanged joint and metal core of the conventional PTFE seal. The improved leak rate of the gasket 150 is at least in part due to the difference 170 between the inner facing material 125 and the outer facing material 130. That is, the increased thickness 160 of the inner facing material 125 relative to the outer facing material 130 results in the inner facing material 125 being compressed sufficiently to create a tight seal between the flanged joint 20 and the metal core 120 before the outer facing material 130 reaches its minimum thickness.

ASTM D149: Standard Test Method for Dielectric Breakdown Voltage and Dielectric Strength of Solid Electrical Insulating Materials at Commercial Power Frequencies specifies testing methods for dielectric breakdown voltage and strength of solid electrical insulating materials at commercial frequencies. Conventional insulation gaskets and the gasket 15 were tested using "Method A," which is a short time test, under testing conditions as specified in ASTM D149. Method A testing applies voltage uniformly to the test electrodes from zero at one of the rates until breakdown occurs. During the testing, breakdown voltages for conventional insulation gaskets were lower than the breakdown voltages associated with the gasket 15. Additionally, the flashover location is improved with the gasket 15.

Comparative testing for electrical breakdown tests were performed with the gasket 15 and conventional gaskets while each were installed in an American Society of Mechanical Engineers ("ASME") B16.5 size 4 inch class 300 flange with no studs. The conventional gasket tested, which was 6 mm thick and faced with rPTFE and mica materials on both sides, had a breakdown voltage of 4.8 kV. For the conventional gasket, the flashover occurred at the interface between the rPTFE and the mica material.

When the same testing was performed on the gasket 15, which was also 6 mm thick and faced with the rPTFE (i.e., the inner facing materials 125 and 125') and the FS material (i.e., the outer facing materials 130 and 130'), the voltage breakdown was 5.0 kV. For the gasket 15, the flashover occurred outside the gasket-sealing surface (i.e., the first annular serrated portions 105 and 105' and the second annular serrated portions 110 and 110'). That is, the flashover did not occur at the interface 134.

Thus, the results clearly demonstrate that the gasket 15, which has the grooves 115 and 115' filled with rPTFE material (i.e., the first inner rings 135 and 135'), increases the breakdown voltage threshold and prevents flashover from occurring at the interface 134.

The conventional gaskets and the gasket 15 were also tested with a teraohmmeter to measure electrical strength of solid electrical insulating material at a constant voltage.

A conventional gasket, which was 6 mm thick, faced with rPTFE and FS facing, and installed in an ASME B16.5 size 4 inch class 300 flange with no studs, was tested with the teraohmmeter and had an electrical strength of 4185 MΩ.

When the same testing, using the teraohmmeter, was performed on the gasket 15, the gasket 15 had an electrical strength of 8199 MΩ.

Thus, the results clearly demonstrate that the gasket 15 showed an electrical strength that is almost twice the value of the conventional gasket, which is a great improvement to electrical strength.

Comparative testing for electrical breakdown tests was performed with the gasket 15 and conventional gaskets while each were installed in an ASME B16.5 size 2 inch class 600 flange with no studs. Electrodes of the teraohmmeter were installed on the flanges to measure the electrical resistance of the conventional gaskets and the gasket 15.

While the conventional gasket, being 6 mm thick and faced with rPTFE and FS laminate, showed a resistance of 406717 MΩ, the gasket 15, again being 6 mm thick and faced with rPTFE and Mica laminate, showed an electrical resistance of 3018000 MΩ. Thus, the results clearly demonstrate that the gasket 15 showed a resistance that was over seven (7) times greater than the resistance of the conventional gasket, which is a great improvement to electrical resistance. The gasket 15 shows a remarkable electrical insulation property compared to a conventional gasket.

The German standard of Dichtungen für die Gasversorgung—Teil 6: Flachdichtungswerkstoffe auf Basis von Fasern, Graphit oder Polytetrafluorethylen (PTFE) für Gasarmaturen, Gasgeräte und Gasleitungen (translated in English to: Gaskets for Gas Supply—Part 6: Gasket materials based on synthetic fibres, graphite or polytetrafluoroethylene (PTFE) for gas valves, gas appliances and gas mains) ("DIN 3535-6") specifies testing methods for gasket sealability. DIN 3535-6 establishes the requirements and tests applicable for gasket materials that come into contact with gases and that are based on synthetic fibres, graphite or PTFE for gas valves, gas appliances, and gas mains at operating temperatures of up to 150° C. Testing of the specific leakage rate are performed using test equipment with two flanges loaded, the gasket dimensions with 50 0/−5 mm (plus 0 mm to minus 5 mm) inside diameter and 90+5/0 mm (plus 5 mm to minus 0 mm) outside diameter assembled between smooth flanges. The test is only carried out at a test temperature of (23±5°) C. The peak-to-valley roughness of the test flanges are Rz≤6.3 μm. The gasket is inserted centrally and loaded with a unit pressure of 32 MPa. An internal pressure of 40 bar nitrogen is then applied at an internal pressure change rate of about 1 bar/sec. After 2 hours, the leaking volume of gas shall be measured, for example with a gas burette (readability ≤0.05 cm$^3$). A specific leakage rate acceptable for synthetic fibres, graphite or PTFE is ≤0.1 mg/(s·m). The gasket 15—being 6 mm thick, faced with the rPTFE (i.e., the inner facing materials 125 and 125') and the FS material (i.e., the outer facing materials 130 and 130'), and having the rings 135 and 135' accommodated in the grooves 115 and 115'—was tested for sealability according to DIN 3535-6 and the leakage was <0.001 mg/(s·m.). Additionally, the gasket 15 was also tested using helium gas and the leakage was 3.12×10$^{-6}$ mg/(s·m.). Thus, the gasket 15 shows outstanding sealability properties.

The gasket 15 electrically insulates pipes and/or other components from electrochemical corrosion. In an example embodiment, the gasket 15 is a ring type gasket. However, in other embodiments, the gasket 15 may include a plurality of bolt holes to receive the bolts 40 and/or the insulation sleeves 45. In an example embodiment, the first inner rings 135 and 135' prevent a spark from passing between the inner facing materials 125 and 125' and the outer facing materials 130 and 130' at the interface 134. Thus, an increased voltage threshold at which a spark occurs is achieved when the first inner ring 135 is accommodated within the groove 115 and beneath the interface 134. Additionally, the spark is prevented from occurring at or near the "leak path" or the interface 134. Additionally, the electrical resistance and electrical strength is greatly improved. In an example embodiment, the gasket 15 may be used in place on a conventional phenolic or plastic coated ring joint gasket in applications where electrical insulation is required.

It is understood that variations may be made in the foregoing without departing from the scope of the disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures. In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. An isolation gasket, comprising:
    a metal core defining:
        an inner serrated annular section that is radially spaced from an outer serrated annular section; and
        an annular groove formed between the inner and outer serrated annular sections;
    a first material accommodated in the annular groove;
    a second material coupled to the inner serrated annular section; and
    a third material coupled to the outer serrated annular section;
    wherein the second material has a first thickness;
    wherein the third material has a second thickness that is less than the first thickness; and
    wherein a top surface of the first material is coupled to both the second material and the third material.

2. The isolation gasket of claim 1, wherein the ratio of the first thickness to the second thickness is between about 4.0 and about 1.5.

3. The isolation gasket of claim 1, wherein the ratio of the first thickness to the second thickness is about 2.0.

4. The isolation gasket of claim 1,
wherein the second material forms a first annular ring and has an outer surface defining an outer diameter;
wherein the third material forms a second annular ring having an inner surface that defines an inner diameter and an upper surface perpendicular to the inner surface; and
wherein a shoulder is formed between the outer surface on the first annular ring and the upper surface of the second annular ring.

5. The isolation gasket of claim 1,
wherein a bottom surface of the first material is coupled to an external surface of the metal core defining the groove.

6. The isolation gasket of claim 1,
wherein the second material comprises an electrical insulation material; and
wherein the third material comprises a fire safe material.

7. The isolation gasket of claim 3,
wherein the metal core has a surface that defines a first inner diameter; and
wherein the second material forms a first annular ring defining a second inner diameter that is less than the first inner diameter.

8. The isolation gasket of claim 7, wherein a difference between the first inner diameter and the second inner diameter is between about 1.5 mm and about 6 mm.

9. An isolation gasket, comprising:
a metal core having a first inner diameter and defining:
   an inner serrated annular section that is radially spaced from an outer serrated annular section; and
   an annular groove formed between the inner and outer serrated annular sections;
a first material accommodated in the annular groove;
a second material coupled to the inner serrated annular section; and
a third material coupled to the outer serrated annular section;
wherein the second material forms a first annular ring defining a second inner diameter that is less than the first inner diameter; and
wherein a top surface of the first material is coupled to both the second material and the third material.

10. The isolation gasket of claim 9, wherein a difference between the first inner diameter and the second inner diameter is between about 1.5 mm and about 6 mm.

11. The isolation gasket of claim 9, wherein a difference between the first inner diameter and the second inner diameter is about 3 mm.

12. The isolation gasket of claim 9, wherein a shoulder is formed between a bottom surface of the second material that is coupled to the inner serrated annular section and a surface of the metal core that defines the first inner diameter.

13. The isolation gasket of claim 10,
wherein the second material has a first thickness; and
wherein the third material has a second thickness that is less than the first thickness.

14. The isolation gasket of claim 9,
wherein a bottom surface of the first material is coupled to an external surface of the metal core defining the groove.

15. A method of electrically isolating flanged joints, comprising:
accommodating a gasket between first and second flanged joints;
wherein the gasket comprises:
   a metal core having an inner diameter and comprising:
      a top surface forming a first annular serrated portion that is concentrically disposed within a second annular serrated portion, the first annular serrated portion being radially spaced from the second annular serrated portion by a top groove; and
      a bottom surface forming a third annular serrated portion that is concentrically disposed within a fourth annular serrated portion, the third annular serrated portion being radially spaced from the fourth annular serrated portion by a bottom groove;
   first and second sealing materials engaging at least a portion of the top surface, the second sealing material being concentrically disposed about an external surface of the first sealing material; and
   third and fourth sealing materials engaging at least a portion of the bottom surface, the fourth sealing material being concentrically disposed about an external surface of the third sealing material;
   a first ring disposed within the top groove, wherein a top surface of the first ring is coupled to both the first material and the second material; and
   a second ring disposed within the bottom groove, wherein a top surface of the second ring is coupled to both the third material and the fourth material;
   wherein the first sealing material has a first thickness;
   wherein the second sealing material has a second thickness that is less than the first thickness;
   wherein the third sealing material has a third thickness;
   wherein the fourth sealing material has a fourth thickness that is less than the third thickness;
   wherein the first sealing material forms a first annular ring defining a first inner diameter that is less than the inner diameter of the metal core; and
   wherein the third sealing material forms a second annular ring defining a second inner diameter that is less than the inner diameter of the metal core;
and
compressing the gasket, using the first and second flanged joints, to sealingly engage the first and second sealing materials to the first flange joint and to sealingly engage the third and fourth sealing materials to the second flange joint.

16. The method of claim 15,
wherein the ratio of the first thickness to the second thickness is between about 4.0 and about 1.5; and
wherein the ratio of the third thickness to the fourth thickness is between about 4.0 and about 1.5.

17. The method of claim 15,
wherein the ratio of the first thickness to the second thickness is about 2.0; and
wherein the ratio of the third thickness to the fourth thickness is about 2.0.

18. The method of claim 15,
wherein a first difference between the inner diameter of the metal core and the first inner diameter is about 3 mm; and
wherein a second difference between the inner diameter of the metal core and the second inner diameter is about 3 mm.

19. The method of claim 15,
wherein a first difference between the inner diameter of the metal core and the first inner diameter is between about 1.5 mm and about 6 mm; and
wherein a second difference between the inner diameter of the metal core and the second inner diameter is between about 1.5 mm and about 6 mm.

20. The method of claim 15,
wherein a first annular shoulder is formed between a bottom surface of the first sealing material and a surface of the metal core that defines the inner diameter; and
wherein a second annular shoulder is formed between a bottom surface of the third sealing material and the surface of the metal core that defines the inner diameter.

* * * * *